(12) United States Patent
Okamura et al.

(10) Patent No.: US 10,399,425 B2
(45) Date of Patent: Sep. 3, 2019

(54) AUTOMOBILE VEHICLE

(71) Applicant: SUBARU CORPORATION, Tokyo (JP)

(72) Inventors: Junya Okamura, Tokyo (JP); Takayasu Daikohara, Tokyo (JP); Chanho Beku, Tokyo (JP); Takashi Umezu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/992,602

(22) Filed: May 30, 2018

(65) Prior Publication Data

US 2019/0009661 A1 Jan. 10, 2019

(30) Foreign Application Priority Data

Jul. 10, 2017 (JP) ................. 2017-134543

(51) Int. Cl.
| | |
|---|---|
| *B60K 1/04* | (2019.01) |
| *B62D 25/20* | (2006.01) |
| *B62D 21/02* | (2006.01) |
| *H01M 2/10* | (2006.01) |
| *B60R 16/04* | (2006.01) |

(52) U.S. Cl.
CPC ................ *B60K 1/04* (2013.01); *B62D 21/02* (2013.01); *B62D 25/20* (2013.01); *H01M 2/1083* (2013.01); *B60K 2001/0438* (2013.01); *B60R 16/04* (2013.01); *B62D 25/2036* (2013.01)

(58) Field of Classification Search
CPC .... B60K 2001/0422; B60K 2001/0433; B60K 2001/0427; B60K 2001/0438
USPC ...................................................... 180/68.5
See application file for complete search history.

(56) References Cited

U.S. PATENT DOCUMENTS

| | | | | |
|---|---|---|---|---|
| 5,501,289 A | * | 3/1996 | Nishikawa | ............... B60K 1/04 |
| | | | | 180/68.5 |
| 6,811,197 B1 | * | 11/2004 | Grabowski | ............... B60R 7/04 |
| | | | | 180/68.5 |

(Continued)

FOREIGN PATENT DOCUMENTS

| | | |
|---|---|---|
| DE | 102010014183 A1 | 10/2011 |
| JP | S57-199176 U1 | 12/1982 |

(Continued)

OTHER PUBLICATIONS

Japanese Office Action dated Dec. 4, 2018 in JP 2017-134543 (4 pages in Japanese with English Machine Translation).

*Primary Examiner* — Jeffrey J Restifo
(74) *Attorney, Agent, or Firm* — Smith, Gambrell & Russell, LLP

(57) ABSTRACT

An automobile vehicle includes a vehicle body that includes a floor panel and a pair of left and right cross members, and a battery pack. The pair of left and right cross members are coupled to the floor panel and extend in a left-right direction. The battery pack is disposed below the floor panel. The battery pack includes a lower battery, an upper battery disposed above the lower battery, and a coupling member that is disposed above the lower battery at the center of the automobile vehicle in the left-right direction in a front view, that extends in the left-right direction, and that is coupled on both end sides to the respective left and right cross members.

20 Claims, 3 Drawing Sheets

(56) References Cited

U.S. PATENT DOCUMENTS

| | | | | |
|---|---|---|---|---|
| 6,994,178 B2* | 2/2006 | Mizuno | B60K 1/04 | 180/299 |
| 7,540,343 B2* | 6/2009 | Nakashima | B60K 1/00 | 180/65.1 |
| 7,771,865 B2* | 8/2010 | Takasaki | B60K 1/04 | 429/71 |
| 7,810,596 B2* | 10/2010 | Tsuchiya | B60K 1/04 | 180/68.1 |
| 7,900,728 B2* | 3/2011 | Suzuki | B60K 1/04 | 180/65.29 |
| 8,042,637 B2* | 10/2011 | Nagata | B60K 1/04 | 180/68.5 |
| 8,118,125 B2* | 2/2012 | Suzuki | B60K 1/04 | 180/68.5 |
| 8,376,074 B2* | 2/2013 | Yoda | B60K 1/04 | 180/65.31 |
| 8,479,858 B2* | 7/2013 | Kodaira | B60K 1/04 | 180/68.5 |
| 8,673,467 B2* | 3/2014 | Katano | B60K 1/04 | 180/65.31 |
| 8,770,331 B2* | 7/2014 | Lim | B60K 1/04 | 180/68.5 |
| 8,813,887 B2* | 8/2014 | Fujii | B60K 1/04 | 180/68.5 |
| 8,881,853 B2* | 11/2014 | Nitawaki | B60K 1/04 | 180/68.5 |
| 8,919,473 B2* | 12/2014 | Bisror | B60N 2/005 | 180/68.5 |
| 8,936,126 B2* | 1/2015 | Nitawaki | B60K 1/04 | 180/68.5 |
| 8,939,246 B2* | 1/2015 | Yamaguchi | B60K 1/04 | 180/311 |
| 9,012,056 B2* | 4/2015 | Lim | B60K 1/04 | 429/120 |
| 9,096,117 B2* | 8/2015 | Matsuda | B60K 6/40 | |
| 9,160,042 B2* | 10/2015 | Fujii | B60K 1/04 | |
| 9,216,638 B2* | 12/2015 | Katayama | B60K 1/04 | |
| 9,236,592 B2* | 1/2016 | Sundararajan | H01M 2/1077 | |
| 9,281,505 B2* | 3/2016 | Hihara | B60K 1/04 | |
| 9,283,838 B2* | 3/2016 | Ohashi | B60K 1/04 | |
| 9,583,800 B2* | 2/2017 | Hwang | B60K 1/04 | |
| 9,774,213 B2* | 9/2017 | Ozaki | B60L 5/00 | |
| 9,827,864 B2* | 11/2017 | Asai | H02J 50/70 | |
| 9,873,456 B2* | 1/2018 | Hara | B60K 1/04 | |
| 9,981,698 B2* | 5/2018 | Maier | B62D 25/2018 | |
| 10,040,413 B2* | 8/2018 | Inagaki | B60R 7/04 | |
| 10,150,346 B2* | 12/2018 | Koyama | B60H 1/00278 | |
| 2007/0007060 A1* | 1/2007 | Ono | B60K 1/04 | 180/65.31 |
| 2007/0289789 A1* | 12/2007 | Tsuchiya | B60K 1/04 | 180/68.2 |
| 2007/0292752 A1* | 12/2007 | Tsuchiya | B60L 11/1874 | 429/120 |
| 2008/0047767 A1* | 2/2008 | Tsuchiya | H01M 2/1072 | 180/68.5 |
| 2009/0183935 A1* | 7/2009 | Tsuchiya | B60K 1/04 | 180/68.1 |
| 2010/0089675 A1* | 4/2010 | Nagata | B60K 1/04 | 180/68.5 |

FOREIGN PATENT DOCUMENTS

| | | |
|---|---|---|
| JP | H10-129227 A | 5/1998 |
| JP | 2010-195150 A | 9/2010 |

* cited by examiner

AUTOMOBILE VEHICLE

CROSS-REFERENCE TO RELATED APPLICATIONS

The present application claims priority from Japanese Patent Application No. 2017-134543 filed on Jul. 10, 2017, the entire contents of which are hereby incorporated by reference.

BACKGROUND

1. Technical Field

The present invention relates to an automobile vehicle in which a battery pack is disposed below a floor panel.

2. Related Art

In a proposed vehicle body floor structure, a tunnel member extending in the front-rear direction of a vehicle body is formed at the center of a floor panel of the vehicle body, components such as a fuel cell stack and a battery are accommodated in the tunnel member, and both ends of a support member that supports the components are coupled to an inner surface of a side wall of the tunnel member (See Japanese Unexamined Patent Application Publication (JP-A) No. 2010-195150). With the vehicle body floor structure, loads applied inward in the left-right direction from side sills in a side collision are transmitted to the side wall of the tunnel member via a seat cross member, and are subsequently transmitted from the side wall of the tunnel member to the support member.

SUMMARY OF THE INVENTION

An aspect of the present invention provides an automobile vehicle including a vehicle body that includes a floor panel and a pair of left and right cross members that are coupled to the floor panel and that extend in a left-right direction, and a battery pack disposed below the floor panel. The battery pack includes a lower battery, an upper battery disposed above the lower battery, and a coupling member that is disposed above the lower battery at a center of the automobile vehicle in the left-right direction in a front view, that extends in the left-right direction, and that is coupled on both end sides to the respective left and right cross members.

DETAILED DESCRIPTION

Figure 1A:
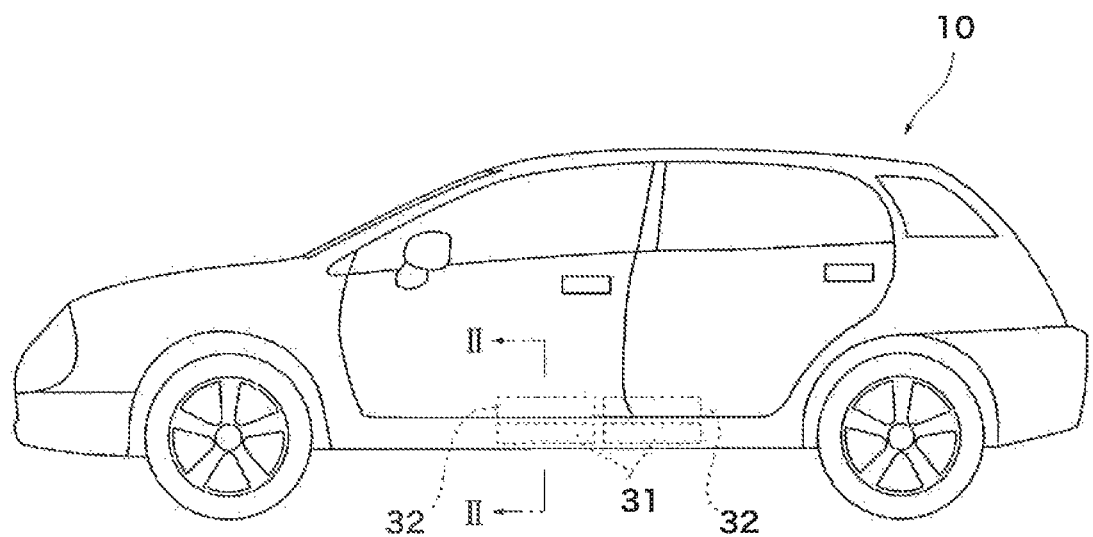
FIG. 1A schematically illustrates the external appearance of an automobile vehicle according to an example of the present invention.

A detailed description is given below of an example of the present invention with reference to the accompanying drawings. It is to be noted that the same or equivalent parts are denoted by the same numeral in the drawings. Further, the same or equivalent components are denoted by the same numeral in the drawings and a duplicative description thereof will be omitted. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the disclosure are optional and may be provided on an as-needed basis. The drawings are schematic and are not intended to be drawn to scale.

The vehicle body floor structure disclosed in JP-A No. 2010-195150 carries a risk of damage to the components accommodated in the tunnel member because when a relatively large load is applied inward in the left-right direction in a side collision, the side wall of the tunnel member that vertically extends is deformed, and the seat cross member moves inward in the left-right direction. In particular, when the components include a battery, the battery compressed by the seat cross member causes, for instance, ignition. Accordingly, there is a need for a safer structure.

It is desirable to provide an automobile vehicle that inhibits a battery disposed below the floor panel from being damaged in a side collision.

Figure 1B:
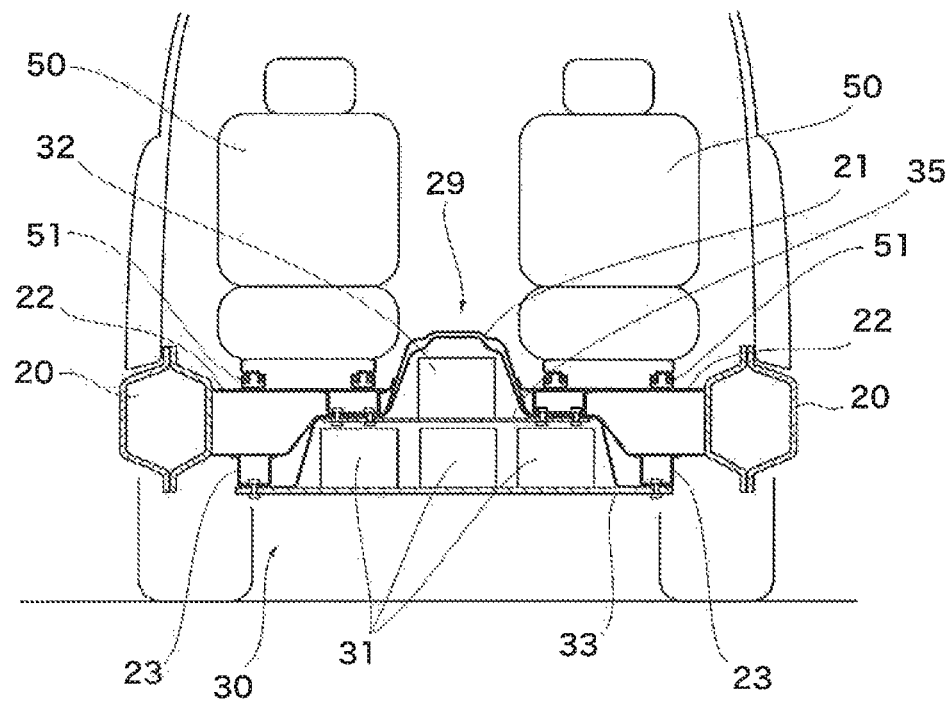
FIG. 1B is a schematic front sectional view of the automobile vehicle.
Figure 2:
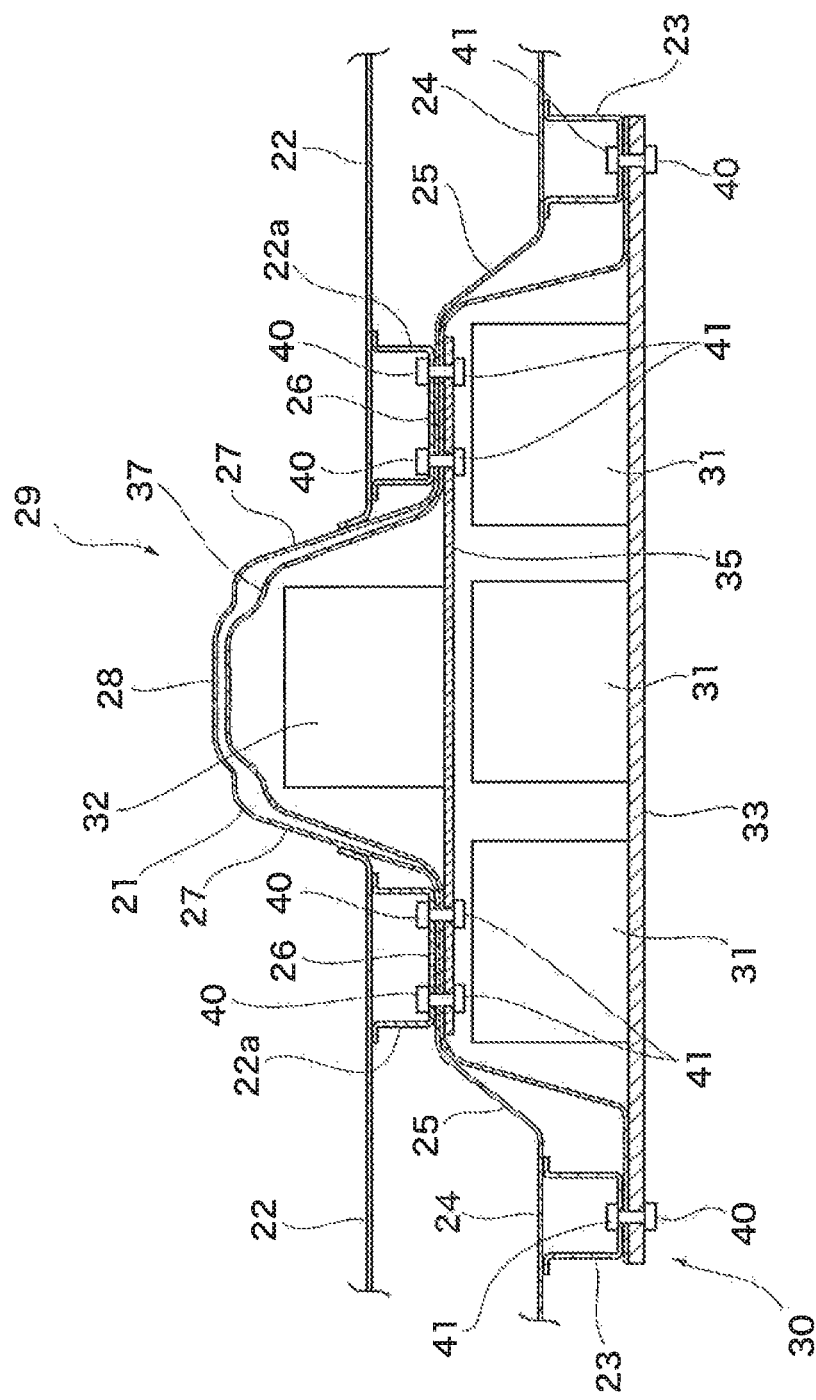
FIG. 2 is a schematic sectional view of FIG. 1A taken along line II-II.
Figure 3:
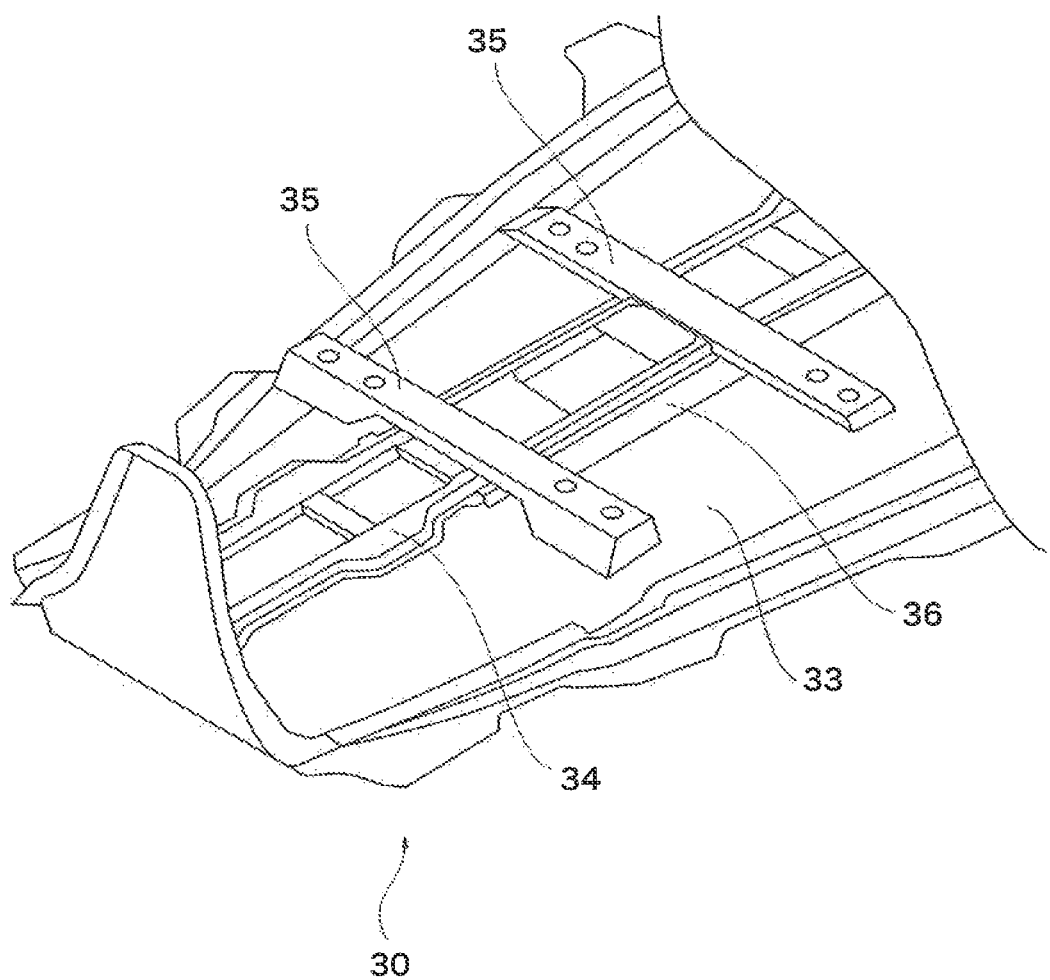
FIG. 3 schematically illustrates a part of a battery pack with a cover member and batteries removed.

FIGS. 1A to FIG. 3 illustrate an example of the present invention. FIG. 1A schematically illustrates the external appearance of an automobile vehicle. FIG. 1B is a schematic front sectional view of the automobile vehicle. FIG. 2 is a schematic sectional view of FIG. 1A taken along line II-II. FIG. 3 schematically illustrates a part of a battery pack with a cover member and batteries removed.

As illustrated in FIG. 1A, an automobile vehicle 10 includes a motor serving as a driving source for wheels and is equipped with lower and upper batteries 31 and 32 that supply power to the motor as illustrated in FIG. 1B. According to the example, the lower and upper batteries 31 and 32 are disposed approximately below front seats and rear seats in a vehicle cabin. The specific structure of each of the lower and upper batteries 31 and 32 is not limited. According to the example, each of the lower and upper batteries 31 and 32 includes battery cells and a battery case that accommodates the battery cells.

As illustrated in FIG. 1B, the automobile vehicle 10 includes a vehicle body obtained, for instance, in a manner in which panel members formed from steel sheets by press molding are integrated and joined by, for instance, spot welding. The vehicle body includes a pair of left and right side sills 20 each having a bag-like section in a front view, a floor panel 21 that is formed on the lower side of the vehicle cabin and that is coupled to the side sills 20, a pair of left and right cross members 22 that are disposed above parts of the floor panel 21 and that extend in the left-right direction, and a pair of left and right side members 23 that are disposed inside the side sills 20 in the left-right direction and below the floor panel 21. The automobile vehicle 10 also includes a battery pack 30 below the floor panel 21. As illustrated in FIG. 2, the battery pack 30 is installed so as to be attachable to and detachable from the vehicle body by using bolts 40 and nuts 41.

As illustrated in FIG. 2, the floor panel 21 is coupled to an inner panel of each side sill 20 in the left-right direction. The floor panel 21 includes a pair of left and right first flat members 24, a pair of left and right first inclined members 25 that are inclined upward from an inner edge of each first flat member 24 in the left-right direction and that extend inward in the left-right direction, a pair of left and right second flat members 26 that extend inward in the left-right direction from an inner edge of each first inclined member 25 in the left-right direction, a pair of left and right second inclined members 27 that are inclined upward from an inner edge of each second flat member 26 in the left-right direction and that extend inward in the left-right direction, and a central upper member 28 that is coupled to an inner edge of each second inclined member 27 in the left-right direction. According to the example, the second inclined members 27 and the central upper member 28 form a tunnel member 29 extending in the front-rear direction.

Each cross member 22 has a substantially hat shape in a side view and forms closed sections together with the first flat members 24, the first inclined members 25, and the second flat members 26 of the floor panel 21. Each cross member 22 is coupled on the inside in the left-right direction to the corresponding second inclined member 27 of the tunnel member 29, and is coupled on the outside in the left-right direction to the corresponding side sill 20. According to the example, the cross members 22 are arranged at an interval at two locations in the front-rear direction and, as illustrated in FIGS. 1A and 1B, correspond to so-called seat cross members to which legs 51 of seats 50 of a car are secured. As illustrated in FIG. 2, each cross member 22 includes a bracket 22a that is disposed in the corresponding closed section and that enables the cross member 22 to be fastened to the battery pack 30. According to the example, bolts 40 and nuts 41 directly fasten each bracket 22a and coupling members 35 of the battery pack 30 with the second flat members 26 of the floor panel 21 and a cover member 37 of the battery pack 30 interposed therebetween.

Each side member 23 has a substantially reversed hat shape in a front view and forms a closed section together with the corresponding first flat member 24 of the floor panel 21. The side members 23 extend over the entire length of the floor panel 21 in the front-rear direction.

As illustrated in FIG. 2, the battery pack 30 includes the lower batteries 31, the upper batteries 32 that are disposed above the lower batteries 31, a support panel 33 that supports the lower batteries 31, a support frame 34 that supports the upper batteries 32, and the coupling members 35 that are disposed above the lower batteries 31 in a front view and that couple the left and right cross members 22 to each other. As illustrated in FIG. 3, the battery pack 30 also includes a support rod 36 that extends upward from the upper surface of the support panel 33 and that supports the support frame 34. As illustrated in FIG. 2, the battery pack 30 also includes the cover member 37 that covers the upper side of the battery pack 30.

The battery pack 30 is attachable to and detachable from the vehicle body from the lower side of the vehicle and is fastened to the vehicle body by using the bolts 40 and the nuts 41. Each of the lower batteries 31 and the upper batteries 32 has a substantially rectangular cuboid shape. The lower batteries 31 are arranged at predetermined intervals in the front-rear direction and in the left-right direction. The upper batteries 32 are arranged at a predetermined interval in the front-rear direction. According to the example, a space in the tunnel member 29 is used to dispose the upper batteries 32 therein.

The support panel 33 is formed of a metal such as steel sheet, covers the lower side of the floor panel 21 of the vehicle, and is fastened at or near the outer edge thereof to the vehicle body by using bolts 40 and nuts 41. The support panel 33 is fastened at predetermined locations on left and right sides to the side members 23 by using the bolts 40 and the nuts 41.

The support frame 34 with a certain width extends in the front-rear direction and supports the upper batteries 32 arranged in the front-rear direction. The coupling members 35 extend in the left-right direction and are coupled on both end sides to the cross members 22. According to the example, the coupling members 35 are coupled to the cross members 22 at locations outside the tunnel member 29 in the left-right direction. The coupling members 35 are coupled to the corresponding cross members 22 arranged in the front-rear direction and are coupled to the support frame 34.

The support rod 36 is formed of a metal such as steel sheet, has a plate-like shape, and is disposed at the center of the vehicle in the left-right direction. According to the example, the support rod 36 extends over the length of a part of the battery pack 30 in the front-rear direction.

In the automobile vehicle 10 having the above structure, the cross members 22 are coupled to the coupling members 35 extending in the left-right direction, and the coupling members 35 are not likely to deform even when a load is applied inward in the left-right direction from the cross members 22 on one side in a side collision. Accordingly, in a side collision, the cross members 22 on one side are appropriately supported at locations at which the cross members 22 are coupled to the coupling members 35, and parts of the cross members 22 outside the locations in the left-right direction are deformed. In a side collision, the outer portions of the side sills 20 and the cross members 22 in the left-right direction are thus deformed with certainty, and this increases the amount of collision energy that the vehicle body absorbs. Accordingly, the cross members 22 on one side can be inhibited from moving inward in the left-right direction, and the upper batteries 32 disposed on the coupling members 35 can be inhibited from being damaged. The load applied to the cross members 22 on one side in a side collision is transmitted to the cross members 22 on the other side via the coupling members 35.

The automobile vehicle 10 according to the example can protect the lower and upper batteries 31 and 32 in a side collision by using the seat cross members. In addition, the seat cross members can provide a countermeasure against the side collision in a wide region in the front-rear direction.

The support panel 33 on the lower side and the coupling members 35 on the upper side are secured to the vehicle body at different vertical locations. For this reason, the battery pack 30 is secured to the vehicle body at three-dimensional points. Thus, the battery pack 30 is inhibited from vibrating vertically relative to the vehicle body during travelling of the vehicle, and the stiffness of the vehicle body is improved.

According to the above example, the battery pack 30 is fastened to the vehicle body from the lower side of the vehicle by using the bolts 40 and the nuts 41. However, the battery pack 30 may be secured thereto by using another method and may be installed from another direction.

According to the above example, the floor panel 21 forms the tunnel member 29 extending in the front-rear direction, and the upper batteries 32 are disposed in the tunnel member 29. However, the upper batteries 32 may be disposed on, for instance, a depression or a projection of the floor panel 21 other than the tunnel member. In the case where the upper batteries 32 are disposed in the tunnel member 29 as in the above example, the upper batteries 32, the cover member 37, and the central upper member 28 of the tunnel member 29 may be coupled to each other. This structure further increases the ability to inhibit vibrations during traveling and the stiffness of the vehicle body.

According to the above example, all of the seat cross members are coupled by the coupling members 35. However, it is only necessary for at least one of the cross members to be coupled. The cross members coupled by the coupling members 35 may be cross members other than the seat cross members.

The example of the present invention is described above. The above example, however, does not limit the invention recited in claims. It is to be noted that all of the combinations of features described according to the example are not necessarily essential.

The invention claimed is:

1. An automobile vehicle comprising:
a vehicle body that comprises
a floor panel including a tunnel member extending in a front-rear direction on the floor panel and a pair of left and right flat members extending in a left-right direction from the tunnel member;
a pair of left and right cross members that are coupled to the floor panel and that extend in the left-right direction; and
a battery pack, comprising an upper battery and a lower battery, disposed below the floor panel; and
a coupling member that is disposed above the lower battery at a center of the automobile vehicle in the left-right direction in a front view, that extends in the left-right direction, and that is coupled to the left and right cross members in the flat members of the floor panel,
wherein the upper battery is disposed above the lower battery, and wherein the coupling member extends externally to an interior of the tunnel member in the left-right direction.

2. The automobile vehicle according to claim 1,
wherein a center of the tunnel member in the left-right direction projects upward,
wherein the upper battery is disposed in the tunnel member, and
wherein the coupling member is coupled to the left and right cross members at locations of the coupling member that are positioned outside of the tunnel member in the left-right direction.

3. The automobile vehicle according to claim 2,
wherein the battery pack is attachable to and detachable from the vehicle body from a lower side of the automobile vehicle and is fastened to the vehicle body by bolts and nuts.

4. The automobile vehicle according to claim 3,
wherein the coupling member is fastened to the left and right cross members by a bolt and a nut.

5. The automobile vehicle according to claim 4,
wherein the vehicle body comprises a pair of left and right side members that extend in the front-rear direction, and
wherein the battery pack comprises a support panel that supports the lower battery, that extends in the left-right direction, and that is fastened on both end sides to the respective left and right side members by a bolt and a nut.

6. The automobile vehicle according to claim 3,
wherein the vehicle body comprises a pair of left and right side members that extend in the front-rear direction, and
wherein the battery pack comprises a support panel that supports the lower battery, that extends in the left-right direction, and that is fastened on both end sides to the respective left and right side members by a bolt and a nut.

7. The automobile vehicle according to claim 3,
wherein each of the left and right cross members is a seat cross member to which a seat is secured.

8. The automobile vehicle according to claim 7,
wherein the automobile vehicle comprises a plurality of the seat cross members that are arranged in the front-rear direction at intervals, and
wherein the automobile vehicle comprises a plurality of the coupling members that are coupled to the seat cross members.

9. The automobile vehicle according to claim 2,
wherein each of the left and right cross members is a seat cross member to which a seat is secured.

10. The automobile vehicle according to claim 9,
wherein the automobile vehicle comprises a plurality of the seat cross members that are arranged in the front-rear direction at intervals, and
wherein the automobile vehicle comprises a plurality of the coupling members that are coupled to the seat cross members.

11. The automobile vehicle according to claim 1,
wherein the battery pack is attachable to and detachable from the vehicle body from a lower side of the automobile vehicle and is fastened to the vehicle body by bolts and nuts.

12. The automobile vehicle according to claim 11,
wherein the coupling member is fastened to the left and right cross members by a bolt and a nut.

13. The automobile vehicle according to claim 12,
wherein the vehicle body comprises a pair of left and right side members that extend in the front-rear direction, and
wherein the battery pack comprises a support panel that supports the lower battery, that extends in the left-right direction, and that is fastened on both end sides to the respective left and right side members by a bolt and a nut.

14. The automobile vehicle according to claim 11,
wherein the vehicle body comprises a pair of left and right side members that extend in the front-rear direction, and
wherein the battery pack comprises a support panel that supports the lower battery, that extends in the left-right direction, and that is fastened on both end sides to the respective left and right side members by a bolt and a nut.

15. The automobile vehicle according to claim 11,
wherein each of the left and right cross members is a seat cross member to which a seat is secured.

16. The automobile vehicle according to claim 15,
wherein the automobile vehicle comprises a plurality of the seat cross members that are arranged in the front-rear direction at intervals, and
wherein the automobile vehicle comprises a plurality of the coupling members that are coupled to the seat cross members.

17. The automobile vehicle according to claim 1,
wherein each of the left and right cross members is a seat cross member to which a seat is secured.

18. The automobile vehicle according to claim 17,
wherein the automobile vehicle comprises a plurality of the seat cross members that are arranged in the front-rear direction at intervals, and wherein the automobile vehicle comprises a plurality of the coupling members that are coupled to the seat cross members.

19. An automobile vehicle comprising:
a vehicle body that comprises a floor panel with a tunnel member, and a pair of left and right cross members that are coupled to the floor panel and that extend in a left-right direction; and
a battery pack disposed below the floor panel,
wherein the battery pack comprises a lower battery, an upper battery disposed above the lower battery, and a coupling member that is disposed above the lower battery at a center of the automobile vehicle in the left-right direction in a front view, that extends in the left-right direction, and that is coupled on both end sides of the coupling member to the left and right cross members, respectively, and
wherein the coupling member is coupled to the left and right cross members at locations of the coupling member that are positioned outside of an interior of the tunnel member in the left-right direction.

20. An automobile vehicle comprising:
a vehicle body that comprises a floor panel and a pair of left and right cross members that are coupled to the floor panel and that extend in a left-right direction; and
a battery pack disposed below the floor panel,
wherein the battery pack comprises a lower battery, an upper battery disposed above the lower battery, and a coupling member that includes an intermediate region that is disposed above the lower battery at a center of the automobile vehicle in the left-right direction in a front view, and which intermediate region of the coupling member extends in the left-right direction at a level below the pair of left and right cross members, and said coupling member being coupled on both end sides of the coupling member, respectively, to the left and right cross members, and wherein the coupling member extends in the left-right direction sufficiently to overlap a portion of each of the left and right cross members in the left-right direction.

* * * * *